(12) United States Patent
Berger

(10) Patent No.: US 6,170,858 B1
(45) Date of Patent: *Jan. 9, 2001

(54) FASTENER MEANS FOR A VEHICLE OCCUPANT RESTRAINT SYSTEM, METHOD FOR FASTENING A VEHICLE OCCUPANT RESTRAINT SYSTEM AND VEHICLE OCCUPANT RESTRAINT SYSTEM

(75) Inventor: Jürgen Berger, Mutlangen (DE)

(73) Assignee: TRW Occupant Restraint Systems GmbH, Aldorf (DE)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/901,756

(22) Filed: Jul. 28, 1997

(30) Foreign Application Priority Data

Aug. 26, 1996 (DE) .......................................... 296 14 832 U

(51) Int. Cl.$^7$ ..................................................... B60R 21/16
(52) U.S. Cl. ......................................... 280/728.2; 411/301
(58) Field of Search .............................. 280/728.2, 728.3, 280/732, 741; 411/301, 263

(56) References Cited

U.S. PATENT DOCUMENTS

| | | | |
|---|---|---|---|
| 3,926,236 | * | 12/1975 | Pouch et al. ........................ 411/179 |
| 3,985,172 | * | 10/1976 | Ballantyne ......................... 411/179 |
| 4,083,458 | * | 4/1978 | Young, Jr. .......................... 211/187 |
| 4,183,550 | * | 1/1980 | Sudou ............................... 280/728.2 |
| 5,176,400 | * | 1/1993 | McGuire et al. ................. 280/728.23 |
| 5,368,327 | * | 11/1994 | Shiraki et al. .................... 280/728.2 |
| 5,484,165 | | 1/1996 | Jenkins et al. .................... 280/728.2 |
| 5,496,058 | | 3/1996 | Kelley et al. ..................... 280/728.2 |
| 5,496,059 | | 3/1996 | Bauer .............................. 280/728.3 |
| 5,538,377 | * | 7/1996 | Stewart et al. ...................... 411/174 |
| 5,577,762 | * | 11/1996 | Hagen et al. ...................... 280/728.2 |
| 5,613,704 | * | 3/1997 | White, Jr. et al. .................... 280/732 |
| 5,725,810 | * | 3/1998 | Elqadah et al. ................... 280/728.2 |
| 5,752,712 | * | 5/1998 | Acker .............................. 280/728.2 |
| 5,785,348 | * | 7/1998 | Donovan et al. .................... 280/732 |
| 5,839,751 | * | 11/1998 | Lutz ................................ 280/728.2 |
| 5,885,042 | * | 3/1999 | Jonatzke .............................. 411/301 |

FOREIGN PATENT DOCUMENTS

| | | |
|---|---|---|
| 02133263 | 5/1990 | (JP) . |
| 9221534 | 12/1992 | (WO) . |

* cited by examiner

*Primary Examiner*—Lanna Mai
*Assistant Examiner*—Lynda Jasmin
(74) *Attorney, Agent, or Firm*—Tarolli, Sundheim, Covell, Tummino & Szabo L.L.P.

(57) ABSTRACT

A fastener means for a vehicle occupant restraint system equipped with a gas bag comprises a holder part, a stud non-rotatably connected to the holder part and a nut screwable on the stud. One of the stud and the nut comprises one of a self-tapping and thread-forming thread, the other one of both parts which has no thread defines a counterpart. The thread deforms a thread in the counterpart in one of a tapping, forming and elastically deforming manner so that the nut after being screwed on is locked against turning out of place.

2 Claims, 2 Drawing Sheets

FASTENER MEANS FOR A VEHICLE OCCUPANT RESTRAINT SYSTEM, METHOD FOR FASTENING A VEHICLE OCCUPANT RESTRAINT SYSTEM AND VEHICLE OCCUPANT RESTRAINT SYSTEM

FIELD OF THE INVENTION

The invention relates to a fastener means for a vehicle occupant restraint system. The invention further relates to a method for fastening a vehicle occupant restraint system, especially for fastening a gas bag to a gas generator and a gas bag module to a vehicle. Furthermore, the invention relates to a vehicle occupant restraint system.

BACKGROUND OF THE INVENTION

Hitherto gas bags on inflators or gas bag modules were secured to a vehicle by nut-and-bolt fasteners, among other things, whereby stud bolts are also used. These are, for example, formed as part of a frame-like holder part which sealingly forces the gas bag in the region of the gas bag orifice against an inflator, as a result of which the gas bag is secured to the inflator. The nut after being screwed on is firmly bonded in place by microencapsulation to lock it to the stud bolt. Furthermore, the invention relates to a method for fastening a vehicle occupant restraint system. The invention also relates to a vehicle occupant restraint system, having gas bag module with a gas bag, a gas generator, a holder part engaging said gas bag, a fastener means for attaching said holder part and said gas bag to said gas generator or said gas generator and said gas bag module to a vehicle, wherein said fastener means comprises a stud non-rotatably connected to said holder part and a nut screwable thereon.

Adhesive remainders rubbed off during the screwing-on action may, however, stick parts of an assembly tool to each other or soil the assembly tool as well as exposed parts of the vehicle. This is why the adhesive needs to be handled very carefully which, however, lengthens the time needed for assembly.

BRIEF SUMMARY OF THE INVENTION

The invention defines a low-cost fastener means for a vehicle occupant restraint system which can be assembled by existing means and which enables the assembly time to be reduced. The fastener means according to the invention which is for a vehicle occupant restraint system equipped with a gas bag comprises a holder part, a stud non-rotatably connected to the holder part and a nut screwable on the stud. One of the stud and the nut comprises one of a self-tapping and thread-forming thread, the other one of both parts which has no thread defines a counterpart. The thread deforms a thread in the counterpart in one of a tapping, forming and elastically deforming manner so that the nut after being screwed on is locked against turning out of place.

If the counterpart, i.e. the nut for instance, is already provided with a thread, the latter is further metalcutted by the self-tapping thread of the stud.

In the case of a thread-forming arrangement, e.g. in the form of a trilobular thread this further shapes the existing thread of the counterpart or deforms it merely elastically. In any case due to the tapping, forming or elastic deforming action, locking the nut against becoming loose of its own accord is created. Trilobular threads which elastically deform an existing thread of a nut have preferably thread flanks which are tip tapered outwardly, the resulting tip biting into the base of the thread in the nut.

Due to the fastener means according to the invention the nut no longer needs to be bonded to the stud and is seated, contrary to nut-and-bolt fasteners used hitherto, locked in place due to higher friction and with zero clearance on the male thread of the fastener part. Accordingly, existing assembly concepts can continued to be used without necessitating any redesign of parts of the vehicle occupant restraint system.

In accordance with preferred embodiments the nut may be a stamped or injection molded item and formed by a cold press procedure. The stud is preferably fixed to the holder part by being pressed or formed into place.

Furthermore, the invention provides for a method for quick and simple fastening of a vehicle occupant restraint system. The method according to the invention uses a fastener means which comprises a holder part, a stud non-rotatably connected to the holder part, and a nut. The nut is screwed onto the stud. The stud or the nut comprises one of a self-tapping and thread-forming thread, the other one of both parts which has no thread defines a counterpart. The thread deformes a thread in the counterpart in one of a tapping, forming and elastically deforming manner so that the nut after being screwed on is locked against turning out of place.

Especially, the method is for attaching a gas bag to a gas generator and for attaching a gas bag module to a vehicle.

The invention further provides a vehicle occupant restraint system, having gas bag module with a gas bag, a gas generator, a fastener means comprising a holder part engaging the gas bag for attaching the holder part and the gas bag to the gas generator. The fastener means further comprises a stud non-rotatably connected to the holder part and a nut screwable thereon. One of the stud and the nut comprises one of a self-tapping and thread-forming thread, the other one of both parts which has no thread defines a counterpart. The thread deforms a thread in the counterpart in one of a tapping, forming and elastically deforming manner so that the nut after is screwed on is locked against turning out of place.

The invention also provides a vehicle occupant restraint system, having gas bag module with a gas bag, a gas generator with a flange defining a holder part, a fastener means comprising the holder part for attaching the gas bag module to a vehicle. The fastener means further comprises a stud non-rotatably connected to the holder part and a nut screwable thereon. One of the stud and the nut comprises one of a self-tapping and thread-forming thread, the other one of both parts which has no thread defines a counterpart. The thread deforms a thread in the counterpart in one of a tapping, forming and elastically deforming manner so that the nut after is screwed on is locked against turning out of place.

DETAILED DESCRIPTION OF PREFERRED EMBODIMENTS

Figure 1:
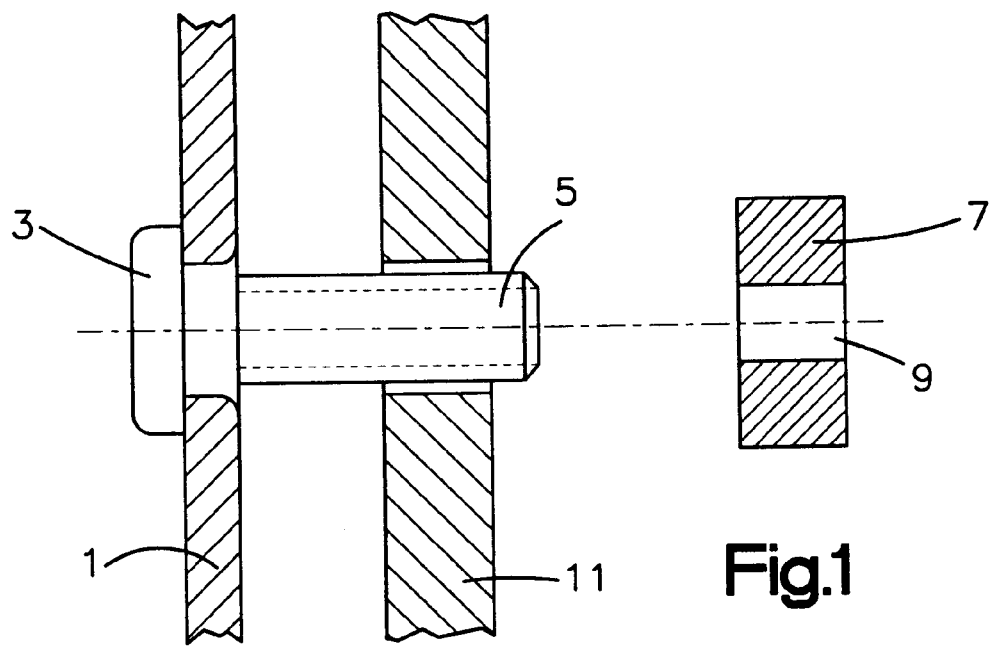
FIG. 1 shows a fastener means according to the invention in accordance with a first embodiment, having a stud bolt and a non-threaded nut for carrying out the method according to the invention, in the depicted embodiment for fastening a gas bag to an inflator.

In FIG. 1 a frame-shaped holder part I is shown, comprising several openings, into which the stud bolts 3 are pressed, of which only one is shown. The stud bolt 3 thus non-rotatably connected to the holder part 1 comprises a section having a self-tapping male thread 5. A nut 7 configured as a stamped part forms the counterpart to the stud bolt 3. An opening 9 in the nut 7, having no thread, has an inner diameter which is adapted to the outer diameter of the self-tapping thread 5 so that the nut 7 can be screwed into place on the male thread 5, thereby tapping a thread in the inner wall of the opening 9. The holder part 1 which is shaped to match the inflation orifice of a gas bag, the stud bolt 3 and the nut 7 form a fastener means for the gas bag (not shown) as part of a vehicle occupant restraint system. The gas bag is fastened in the region of its gas bag orifice gas-tight to a gas ejection port of an inflator by the fastener means. The gas ejection port of the inflator is surrounded by a flange 11 formed on the inflator.

For fastening the gas bag the latter is placed in the region of the gas bag orifice on the flange 11 and the holder part 1 in turn on the gas bag in the region of the gas bag orifice. The stud bolts 3 extend through corresponding openings in the gas bag and in the flange 11. The nut 7 is turned on the stud bolt 3 a female thread is tapped so that in the inner wall of the opening 9. The holder part 1 in conclusion presses the gas bag in the region of the gas bag orifice against the flange 11 so that a gas-tight fastening of the gas bag is achieved.

Nut-locking by bonding the nut 7 to the stud bolt 3 is not necessary since between the male thread 5 and the tapped female thread enhanced friction occurs preventing the nut 7 from slackening.

Fitting the gas bag may also be done by an assembly means semi- or fully automatically, whereby conventional assembly means, in which nuts having a female thread are screwed onto a stud bolt, being able to be used further without necessitating considerable changes.

In addition it is also possible to fasten a complete gas bag module to a vehicle part, for instance a steering wheel hub, by stud bolts having self-tapping male threads and counterparts in the form of nuts having no thread.

Figure 2:
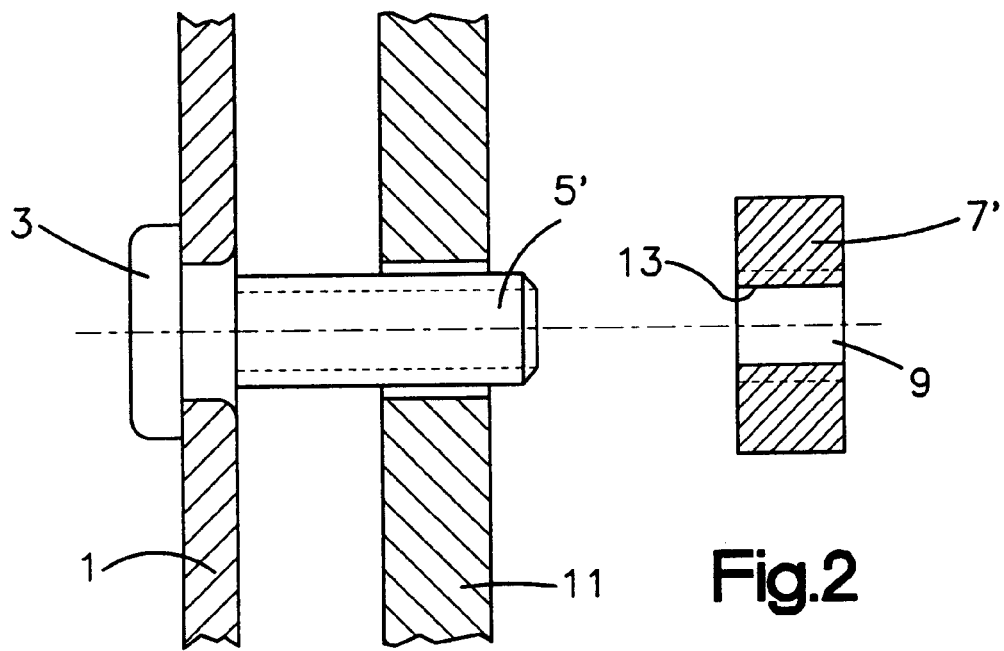
FIG. 2 shows a further embodiment of the fastener means according to the invention having a thread-forming stud bolt and a nut having a metric thread.

The embodiment shown in FIG. 2 differs from that described on the basis of FIG. 1 in that the stud bolt 3 is provided thread-forming in the form of a trilobular thread 5'. The nut 7' comprises a metric female thread 13. On screwing-on of the nut 7', thread 5' plastically deforms the thread 13 or deforms it merely elastically, depending on the dimensions of the threads 5' and 13 with respect to each other. Due to the force being higher as compared to conventional thread pairings for screwing on the nut 7', an enhanced loosening moment is generated which makes sure that the nut 7' is locked against slackening of its own accord. If the thread 13 is merely elastically deformed, the nut 7' can be released and then again screwed on to the thread 5' without eliminating the locking effect.

Figure 3:
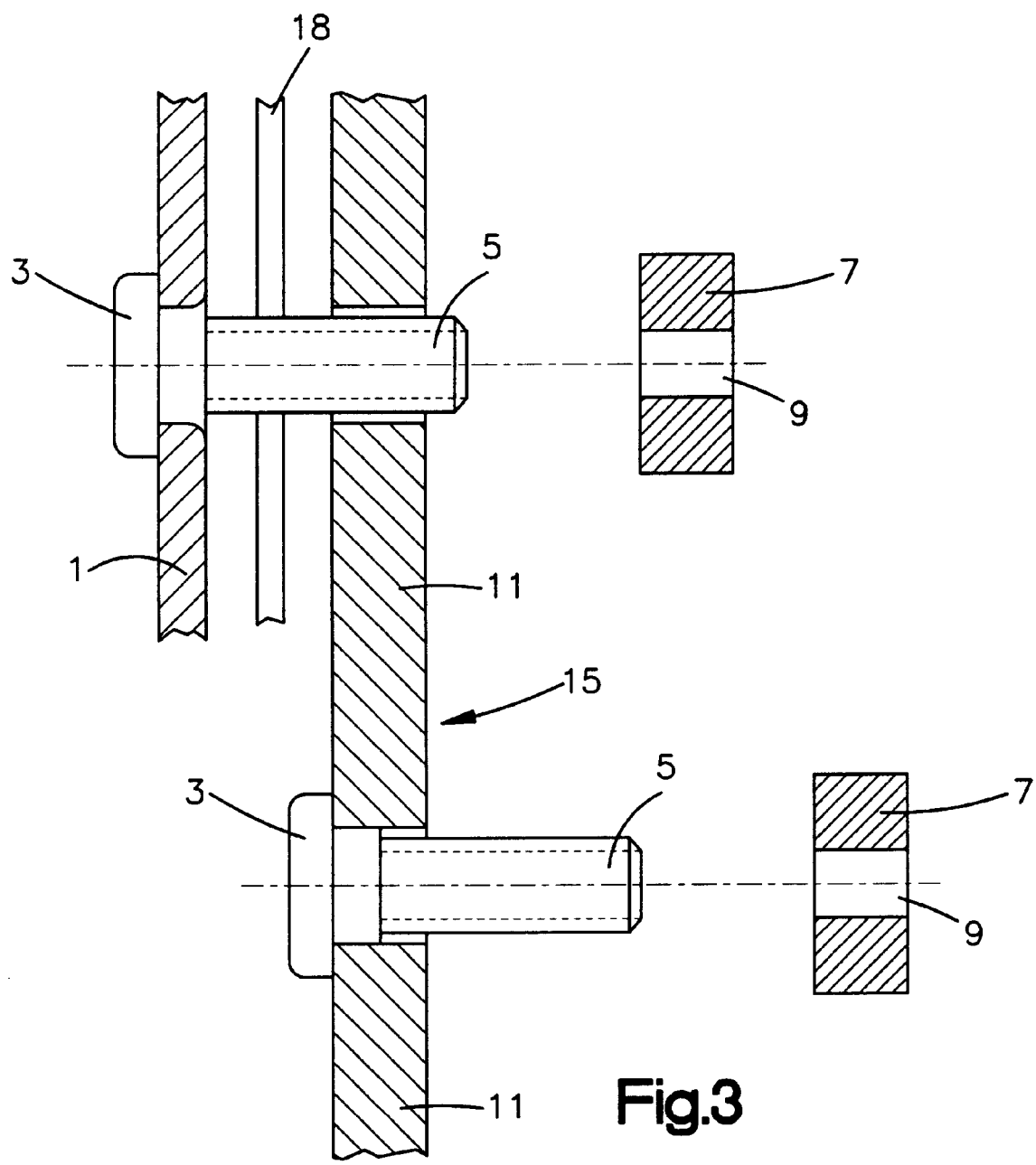
FIG. 3 shows a vehicle occupant restraint system according to the invention.

In FIG. 3 a vehicle occupant restraint system is shown, having gas bag module with a gas bag 18, a gas generator comprising a holding part, defining the flange 11 of the gas generator, and a fastener means for attaching the gas bag module to a vehicle. The fastener means comprises a stud 3 non-rotatably connected to the flange 11 and a nut 7 screwable thereon. There is provided a further fastener means with a holder part 1 which is arranged within the gas bag and is to attach the gas bag 18 to the gas generator 15. Such further fastener means also comprises a stud 3 and a nut 7. The studs 3 or the nuts 7 comprise a self-tapping or thread-forming thread 5 for tapping, forming or elastically deforming a thread in the counterpart so that the nuts 7 after being screwed on is locked against turning out of place.

What is claimed is:

1. A method for fastening a vehicle occupant restraint system by using a fastener means for fastening a gas bag of the occupant restraint system to a flange of a gas generator which comprises a holder part, a stud non-rotatably connected to said holder part by pressing said stud in place and a rotatable nut, said nut being screwed onto said stud, said stud and said nut defining first and second parts, one of said stud and said nut comprising a thread-forming thread, the other one of said first and second parts which has no thread defining a counterpart, and said thread deforming a thread in said counterpart in a forming and elastically deforming manner so that said nut after being screwed on is locked against rotation by said thread.

2. A method for fastening a vehicle occupant restraint system by using a fastener means for fastening a gas bag module of the occupant restraint system which comprises a holder part, a stud non-rotatably connected to said holder part by pressing said stud in place, and a rotatable nut, said nut being screwed onto said stud, said stud and said nut defining first and second parts, one of said stud and said nut comprising a thread-forming thread, the other one of said first and second parts which has no thread defining a counterpart, and said thread deforming a thread in said counterpart in a forming and elastically deforming manner so that said nut after being screwed on is locked against rotation by said thread.

* * * * *